(12) United States Patent
Wang

(10) Patent No.: US 10,449,549 B2
(45) Date of Patent: Oct. 22, 2019

(54) ENVIRONMENTALLY FRIENDLY FERTILIZER DEVICE BASED ON BIG DATA

(71) Applicant: Guosong Ge, Jinhua (CN)

(72) Inventor: Huanyan Wang, Pinghu (CN)

(73) Assignee: Guosong Ge, Jinhua, Zhejiang Province (CN)

( * ) Notice: Subject to any disclaimer, the term of this patent is extended or adjusted under 35 U.S.C. 154(b) by 0 days.

(21) Appl. No.: 16/236,353

(22) Filed: Dec. 29, 2018

(65) Prior Publication Data

US 2019/0135709 A1    May 9, 2019

(30) Foreign Application Priority Data

Jul. 4, 2018   (CN) .......................... 2018 1 07230784

(51) Int. Cl.
*B02C 23/38* (2006.01)
*C05F 9/02* (2006.01)
(Continued)

(52) U.S. Cl.
CPC .......... *B02C 23/38* (2013.01); *B01F 13/1047* (2013.01); *B02C 23/04* (2013.01); *B02C 23/20* (2013.01); *C05F 9/02* (2013.01); *C05F 17/0027* (2013.01); *C05F 17/02* (2013.01); *C05F 17/0205* (2013.01); *C05F 17/0235* (2013.01); *B01F 2013/108* (2013.01);
(Continued)

(58) Field of Classification Search
CPC ............ B01F 13/1047; B01F 2013/108; B01F 2013/1083; B01F 2215/0054; B02C 23/20; B02C 23/38; C05F 9/02; C05F 17/02
See application file for complete search history.

(56) References Cited

U.S. PATENT DOCUMENTS

| 2010/0058821 | A1* | 3/2010 | Romano ............. C05F 17/0063 71/11 |
| 2019/0054475 | A1* | 2/2019 | Gabay ................. B02C 18/0084 |

FOREIGN PATENT DOCUMENTS

| CN | 106591108 | 4/2017 |
| CN | 206763045 | 12/2017 |

(Continued)

OTHER PUBLICATIONS

First Office Action for Chinese Counterpart Application 201810723078.4 dated Nov. 20, 2018.

(Continued)

*Primary Examiner* — Shelley M Self
*Assistant Examiner* — Joseph Finan

(57) ABSTRACT

The invention discloses an environmentally friendly fertilizer device based on big data, comprising a work box and a crushing space set in the work box, wherein a crushing driving space is set in one end wall of the crushing space, wherein a crushing mechanism is set in the crushing driving space; by turning on a first electromagnetic switch, the kitchen garbage enters the crushing space from the feed inlet, so the kitchen garbage is crushed by the crushing space. A transmission space is arranged in the lower end wall of the crushing space, and a driving space is set in the lower end wall of the crushing driving space; a stirring space is set in the lower end wall of the transmission space; the crushed kitchen garbage enters the stirring space through a circulation pipeline and is stirred by the stirring mechanism, thereby the kitchen garbage can be fully fermented.

6 Claims, 2 Drawing Sheets

(51) Int. Cl.
    *C05F 17/00*     (2006.01)
    *C05F 17/02*     (2006.01)
    *B01F 13/10*     (2006.01)
    *B02C 23/04*     (2006.01)
    *B02C 23/20*     (2006.01)

(52) U.S. Cl.
    CPC ................. *B01F 2013/1083* (2013.01); *B01F 2215/0054* (2013.01); *Y02A 40/215* (2018.01)

(56) References Cited

FOREIGN PATENT DOCUMENTS

| | | |
|---|---|---|
| CN | 206858460 | 1/2018 |
| CN | 107904147 | 4/2018 |
| CN | 108187883 | 6/2018 |

OTHER PUBLICATIONS

Notification of Grant for Chinese Counterpart Application 201810723078.4 dated Dec. 11, 2018.

\* cited by examiner

ENVIRONMENTALLY FRIENDLY FERTILIZER DEVICE BASED ON BIG DATA

CROSS-REFERENCES TO RELATED APPLICATIONS

The present application claims priority from Chinese application No. 2018107230784 filed on 2018 Jul. 4 which is hereby incorporated by reference in its entirety.

TECHNICAL FIELD

The invention relates to the field of waste recycling, in particular to an environmentally friendly fertilizer device based on big data.

BACKGROUND OF THE INVENTION

Nowadays, with the development of science and technology and the development of the society, the shortage of resources has an increasing impact on economic and social development. The recycling of waste resources has become an important method for solving the problem of resource scarcity in the current society. However, the kitchen garbage can not be effectively crushed, fermented and quantitatively collected in the kitchen garbage treatment device at the present stage, so that the follow-up operation is directly or indirectly influenced, and the working difficulty is increased, and the production cost is influenced.

BRIEF SUMMARY OF THE INVENTION

The purpose of the invention is to provide an environmentally friendly fertilizer device based on big data so as to overcome the problems existing in the above background art.

The invention provides the following technical proposal to achieve the above aim: an environmentally friendly fertilizer device based on big data comprises a work box, wherein a crushing space is set in the work box; a feed inlet set in upper end wall of the crushing space, wherein the upper end wall of the feed inlet is communicated with the outside; wherein a crushing driving space is set in one end wall of the crushing space, wherein a crushing mechanism is set in the crushing driving space; a transmission space arranged in the lower end wall of the crushing space; a driving space set in the lower end wall of the crushing driving space; a stirring space set in the lower end wall of the transmission space; a dosing space set in the lower end wall of the driving space; a hydraulic space mounted in the lower end wall of the stirring space; a circulation pipeline communicated with the stirring space set in the lower end wall of the crushing space, wherein a first electromagnetic switch is set in the circulation pipeline; a stirring mechanism arranged in the driving space; a hydraulic cavity set in the one end wall of the hydraulic space, wherein a piston is slidably connected in the hydraulic cavity, and a piston rod is fixedly connected to the one end face of the piston, wherein the one end of the piston rod penetrates through the one end wall of the hydraulic cavity and the one end wall of the hydraulic space and is located in the dosing space, wherein a hydraulic pipeline communicated with the hydraulic cavity on the two sides of the piston is arranged in the upper end wall of the hydraulic cavity, wherein a hydraulic pump is arranged in the hydraulic pipeline; a C-shaped block fixedly connected to the one end of the piston rod, wherein a sliding rod is fixedly connected to the upper end face of the piston rod located in the hydraulic space, wherein a sliding block groove is set in the upper end wall of the hydraulic space, and the lower end wall of the sliding block groove is communicated with the hydraulic space, wherein a sliding block is slidably connected in the sliding block groove, wherein the upper end of the sliding rod penetrates through the lower end wall of the sliding block groove and is fixedly connected with the sliding block; a drainage pipe fixedly connected to one end wall of the dosing space, wherein a drainage pipeline is arranged in the drainage pipe, and the drainage pipeline is communicated with a fermentation broth output pipeline, wherein a drainage switch is slidably connected in the lower end of the drainage pipeline, and the one end of the drainage switch penetrates through the one end wall of the drainage pipeline and is located in the dosing space; wherein the drainage switch is internally provided with a drainage hole, the upper end wall and the lower end wall of which penetrate through the upper end face and the lower end face of the drainage switch; a spring block fixedly connected to the lower end wall of the dosing space, wherein a spring groove is set in the upper end face of the spring block, and a telescopic spring is fixedly connected to the lower end wall of the spring groove; wherein the upper end of the telescopic spring penetrates through the upper end wall of the spring groove and is located in the dosing space, and a bearing plate is fixedly connected to the upper end of the telescopic spring, and the one side of the spring block is provided with a hydraulic cylinder fixedly connected with the lower end wall of the dosing space, wherein a pushing space is arranged in the interior of the hydraulic cylinder, and a hydraulic plate is slidably connected in the pushing space, wherein a pushing rod is fixedly connected to the upper end face of the hydraulic plate, and the upper end of the pushing rod penetrates through the upper end wall of the pushing space and is fixedly connected with the lower end face of the bearing plate; a rack fixedly connected to the one side of the lower end face of the bearing plate; a toggle rotating shaft rotationally connected to the one end wall of the dosing space, wherein a toggle gear is fixedly connected to the upper end of the shaft body of the toggle rotating shaft, and the one side of the rack is in meshed engagement with the one end of the toggle gear; a toggle rod fixedly connected to the one end of the toggle rotating shaft, wherein the upper end of the toggle rod penetrates through the one end of the drainage switch and is in sliding connection with it; a capacity bucket rotationally connected to the upper end wall of the bearing plate, wherein a return spring is fixedly connected to the lower end face of the capacity bucket, wherein the lower end of the return spring is fixedly connected with the upper end face of the bearing plate; a supporting block fixedly connected to the one side of the upper end face of the bearing plate; a rotating block fixedly connected to one side of the lower end face of the capacity bucket, wherein the supporting block is in rotational engagement with the rotating block; a guide rail fixedly connected with the one end wall of the dosing space arranged on the one side of the bearing plate, wherein a discharge pipeline communicated with the outside space is arranged on the one end wall of the dosing space, and a fourth electromagnetic switch is arranged in the discharge pipeline; a warning mechanism arranged on the upper end face of the work box.

Preferably, the crushing mechanism comprises a driving motor, wherein the driving motor is fixedly connected with one end wall of the crushing driving space; wherein a driving shaft is in power connection with one end face of the driving motor, and one end of the driving shaft penetrates through the other end wall of the crushing driving space and is rotationally connected with one end wall of the crushing space; a first driven shaft arranged on the lower side of the driving motor, wherein one end of the first driven shaft penetrates through the other end wall of the crushing driving space and is rotationally connected with one end wall of the crushing space, and the other end of the first driven shaft is rotationally connected with the one end wall of the crushing driving space; wherein the driving shaft located in the crushing driving space is fixedly connected with a transmission gear, and the lower side of the transmission gear engages with a first driven gear fixedly connected with the first driven shaft; wherein a second driven gear fixedly connected with the first driven shaft is arranged on one side of the first driven gear, and a fine crushing shaft below the first driven shaft is located in the crushing driving space, wherein one end of the fine crushing shaft penetrates through the other end wall of the crushing driving space and is rotationally connected with one end wall of the crushing space, and the other end of the fine crushing shaft is rotationally connected with one end wall of the crushing driving space; wherein the fine crushing shaft located in the crushing driving space is fixedly connected with a belt gear which is connected with the second driven gear on the upper side through a belt, wherein a first fine crushing gear fixedly connected with the fine crushing shaft is arranged on the one side of the belt gear, wherein the lower side of the fine crushing shaft is provided with a driven fine crushing shaft, wherein one end of the driven fine crushing shaft penetrates through the other end wall of the crushing driving space and is rotationally connected with one end wall of the crushing space, and the other end of the driven fine crushing shaft is rotationally connected with one end wall of the crushing driving space; wherein the lower side of the first fine crushing gear engages with a second fine crushing gear fixedly connected with the driven fine crushing shaft; wherein a plurality of sets of rough cutting blades are fixedly connected to the driving shaft located in the crushing space and the first driven shaft located in the crushing space, and a plurality of sets of fine cutting blades are fixedly connected to the fine crushing shaft located in the crushing space and the driven fine crushing shaft located in the crushing space.

Preferably, the stirring mechanism comprises a stirring motor, wherein the stirring motor is fixedly connected with one end wall of the driving space, wherein one end face of the stirring motor is in power connection with a stirring driving shaft, one end of which penetrates through the other end wall of the driving space and is located in the transmission space, and is fixedly connected with a vertical bevel gear; wherein the lower side of the vertical bevel gear engages with a horizontal bevel gear; a stirring shaft fixedly connected with the center of the horizontal bevel gear, wherein the lower end of the stirring shaft penetrates through the lower end wall of the transmission space and is located in the stirring space, and the upper end of the stirring shaft is rotationally connected with the upper end wall of the transmission space, and a plurality of groups of stirring rods are fixedly connected to the lower end of the stirring shaft; a liquid injection pipeline arranged on one end wall of the stirring space, wherein one end wall of the liquid injection pipeline is communicated with the outside space, and a second electromagnetic switch is arranged in the liquid injection pipeline, wherein the lower end wall of the stirring space is provided with a garbage discharge pipeline which slants down to the left and is communicated with the outside space, and a third electromagnetic switch is arranged in the garbage discharge pipeline, and the fermentation broth output pipeline communicated with the dosing space is arranged on the other end wall of the stirring space.

Preferably, the length of the upper end of one side of the C-shaped block is far larger than the length of the lower end of the one side, and the height of the C-shaped block is slightly larger than that of the capacity bucket.

Preferably, the elasticity of the telescopic spring is far larger than the sum of the gravity of the bearing plate and the capacity bucket on the upper end.

Preferably, the warning mechanism comprises a warning lamp; a power box arranged in one end face of the work box, wherein the power box is connected with the warning lamp through an electric wire.

Compared with the prior art, the benefits of the invention are: when the invention is in the working process, the driving motor works to drive the driving shaft to rotate, and the first driven shaft is driven to rotate under the transmission of the gear train; and then the first driven shaft drives the fine crushing shaft to rotate under the transmission of the belt, and the fine crushing shaft drives the driven fine crushing shaft to rotate under the transmission of the gear train; at this moment, the first electromagnetic switch is turned on, and the kitchen garbage enters the crushing space from the feed inlet, and the driving shaft and the first transmission shaft rotate to drive the rough cutting blade to rotate, so that the kitchen garbage is preliminarily crushed; and then the fine crushing shaft and the driven fine crushing shaft rotate to drive the fine cutting blade to rotate, so that the kitchen garbage is further crushed, and the crushed kitchen garbage enters the stirring space through the circulation pipeline; and then the driving motor is turned off, and the stirring motor is driven to work, which drives the stirring driving shaft to rotate, and the stirring shaft is driven to rotate under the transmission of the bevel gear train; at this moment, the first electromagnetic switch is turned off, and the second electromagnetic switch is turned on, and the fermentation broth is injected through the liquid injection pipeline; after the fermentation broth is injected, the second electromagnetic switch is turned off for fermentation, and when fermentation is completed, an electromagnetic switch in the fermentation broth output pipeline is turned on, and the fermentation broth enters the capacity bucket through the drainage pipeline and the drainage hole. As the fermentation broth in the capacity bucket is increasing, the bearing plate is pressed downwards, and the rack fixed on the bearing plate drives the toggle gear to rotate, so that the drainage switch is driven to move forward, so that the drainage hole is slowly closed, and when the fermentation broth in the capacity bucket reaches a certain amount, the drainage hole is completely closed, and then the fourth electromagnetic switch is turned on, and the hydraulic pump works, and the piston rod is firstly stretched, which drives the C-shaped block at the top end of the piston rod to move towards one side; the upper end of the C-shaped block pushes the capacity bucket, so that the fermentation broth in the capacity bucket is poured out, and the lower end of the C-shaped block limits the lifting of the bearing plate, and the fermentation broth in the capacity bucket flows into the discharge pipeline through the guide rail and then is discharged to the outside; after the liquid in the capacity bucket is completely poured out, the hydraulic pump works reversely, so that the piston rod is driven to contract, so that the C-shaped block at the top end of the piston rod returns to the original position; and then the capacity bucket is separated from the upper end of the C-shaped block, and the capacity bucket is returned to the original position through recovery of the return spring, and the bearing plate is separated from the lower end of the C-shaped block and is risen to the original position through the recovery of the telescopic spring, and then the toggle gear and the rack are driven to rotate so as to drive the drainage switch to move to one side, so that the drainage hole is completely opened; the fermentation liquid is poured into the capacity bucket again, and after the fermentation broth in the stirring space is exhausted, the electromagnetic switch in the fermentation broth output pipeline is turned off, and the second electromagnetic switch is turned on, and the stirring motor is activated, and water is injected from the liquid injection pipeline into the stirring space; when the water is injected to a certain amount, the second electromagnetic switch is turned off, and the third electromagnetic switch is turned on, so that the fermentation residues are discharged from the garbage discharge pipeline; the third electromagnetic switch is turned off and the stirring motor is turned off after the fermentation residues are discharged and the above steps are repeated. The device is simple in structure and convenient to operate, it enjoys the advantages that the energy-saving transmission of the device may be realized under mechanical transmission, and operation of the device may be realized under the condition of less power source, and the kitchen garbage may be fully fermented, so that the subsequent retreatment processes can be reduced.

DETAILED DESCRIPTION OF THE INVENTION

The technical proposal in the present invention embodiments are clearly and completely described in the following with reference to the drawings to be used in the description of the embodiments in this invention. Obviously, the described embodiments are only a part of the embodiments of the present invention rather than all embodiments. All other embodiments obtained by persons of ordinary skill in the art based on the embodiment of the present invention without creative efforts shall fall within the protection scope of the present invention.

Figure 1:
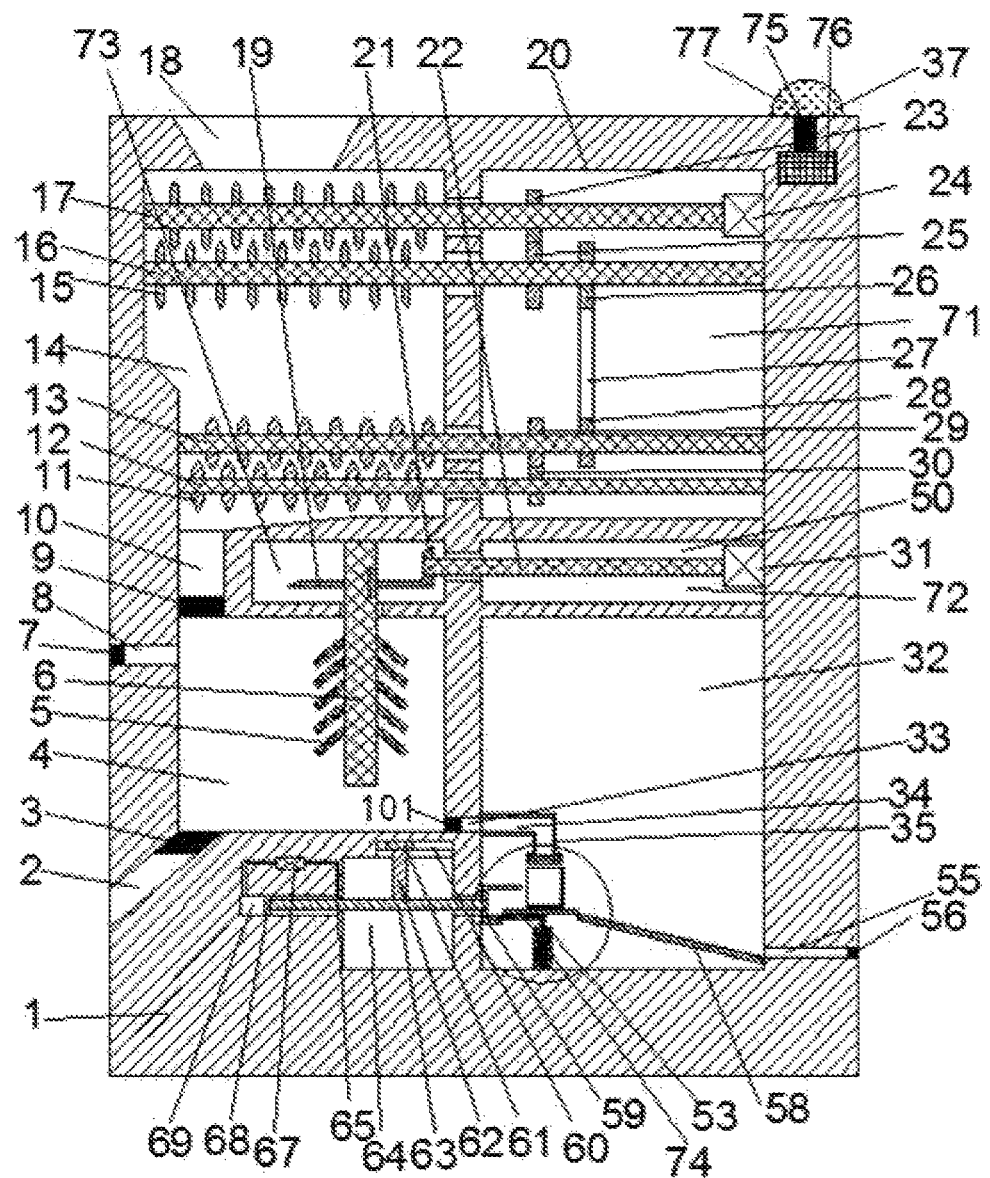
FIG. 1 is a front-view schematic structural diagram showing overall configuration of an environmentally friendly fertilizer device based on big data in this invention.
Figure 2:
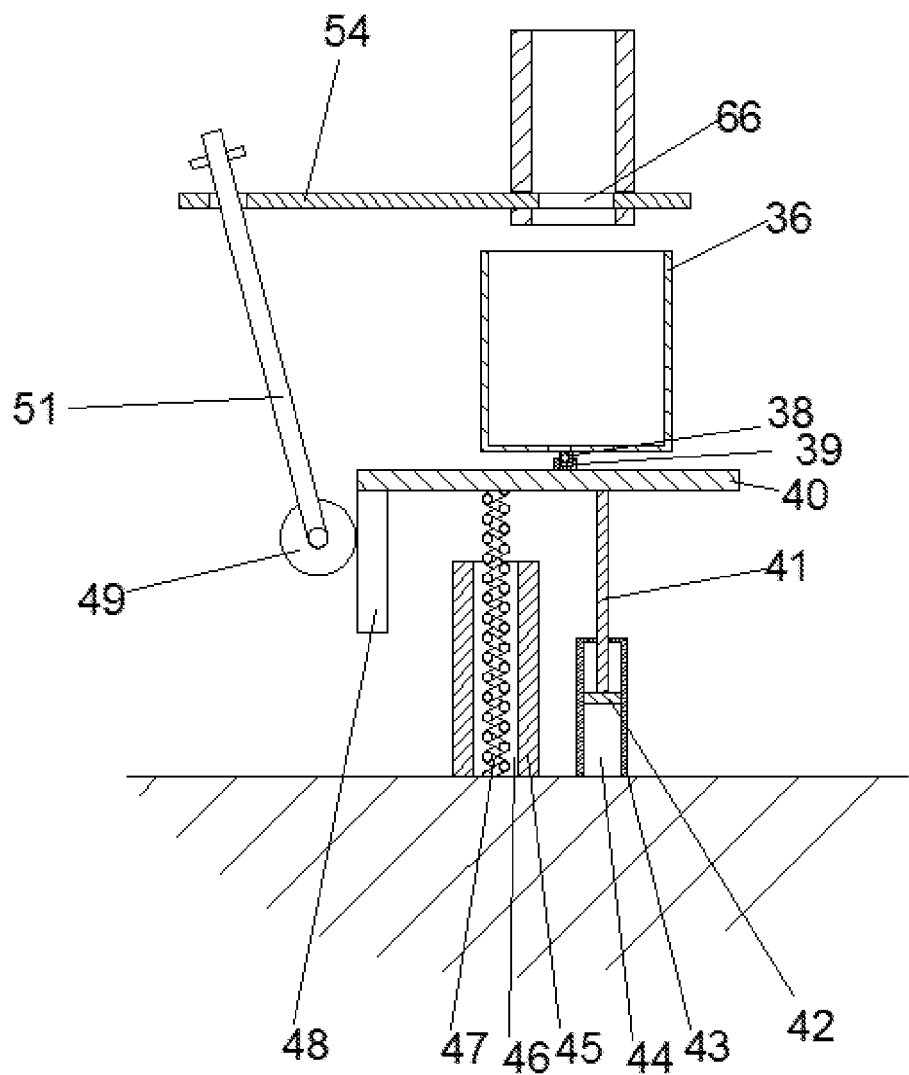
FIG. 2 is the left view of a enlarged schematic structural diagram of the capacity bucket in an environmentally friendly fertilizer device based on big data in this invention.

Referring to FIG. 1-FIG. 2, an embodiment of this invention: an environmentally friendly fertilizer device based on big data, comprising a work box 1; a crushing space 14 set in the work box 1; a feed inlet 18 set in the upper end wall of the crushing space 14, wherein the upper end wall of the feed inlet is communicated with the outside; wherein a crushing driving space 71 is set in one end wall of the crushing space 14, wherein a crushing mechanism 20 is set in the crushing driving space 71; a transmission space 73 arranged in the lower end wall of the crushing space 14; a driving space 72 set in the lower end wall of the crushing driving space 71; a stirring space 4 set in the lower end wall of the transmission space 73; a dosing space 32 set in the lower end wall of the driving space 72; a hydraulic space 64 mounted in the lower end wall of the stirring space 4; a circulation pipeline 10 communicated with the stirring space 4 set in the lower end wall of the crushing space 14, wherein a first electromagnetic switch 9 is set in the circulation pipeline 10; a stirring mechanism 50 arranged in the driving space 72; a hydraulic cavity 69 set in one end wall of the hydraulic space 64, wherein a piston 68 is slidably connected in the hydraulic cavity 69, and a piston rod 63 is fixedly connected to one end face of the piston 68, wherein one end of the piston rod 63 penetrates through one end wall of the hydraulic cavity 69 and one end wall of the hydraulic space 64 and is located in the dosing space 32, wherein a hydraulic pipeline 65 communicated with the hydraulic cavity 69 on the two sides of the piston 68 is arranged in the upper end wall of the hydraulic cavity 69, wherein a hydraulic pump 67 is arranged in the hydraulic pipeline 65; a C-shaped block 59 fixedly connected to one end of the piston rod 63, wherein a sliding rod 62 is fixedly connected to the upper end face of the piston rod 63 located in the hydraulic space 64, wherein a sliding block groove 60 is set in the upper end wall of the hydraulic space 64, and the lower end wall of the sliding block groove 60 is communicated with the hydraulic space 64, wherein a sliding block 61 is slidably connected in the sliding block groove 60, wherein the upper end of the sliding rod 62 penetrates through the lower end wall of the sliding block groove 60 and is fixedly connected with the sliding block 61; a drainage pipe 35 fixedly connected to one end wall of the dosing space 32, wherein a drainage pipeline 34 is arranged in the drainage pipe 35, and the drainage pipeline 34 is communicated with a fermentation broth output pipeline 33, wherein a drainage switch 54 is slidably connected in the lower end of the drainage pipeline 34, and the one end of the drainage switch 54 penetrates through the one end wall of the drainage pipeline 34 and is located in the dosing space 32; wherein the drainage switch 54 is internally provided with a drainage hole 66, the upper end wall and the lower end wall of which penetrate through the upper end face and the lower end face of the drainage switch 54; a spring block 45 fixedly connected to the lower end wall of the dosing space 32, wherein a spring groove 46 is set in the upper end face of the spring block 45, and a telescopic spring 47 is fixedly connected to the lower end wall of the spring groove 46; wherein the upper end of the telescopic spring 47 penetrates through the upper end wall of the spring groove 46 and is located in the dosing space 32, and a bearing plate 40 is fixedly connected to the upper end of the telescopic spring 47, and the one side of the spring block 45 is provided with a hydraulic cylinder 43 fixedly connected with the lower end wall of the dosing space 32, wherein a pushing space 44 is arranged in the interior of the hydraulic cylinder 43, and a hydraulic plate 42 is slidably connected in the pushing space 44, wherein a pushing rod 41 is fixedly connected to the upper end face of the hydraulic plate 42, and the upper end of the pushing rod 41 penetrates through the upper end wall of the pushing space 44 and is fixedly connected with the lower end face of the bearing plate 40; a rack 48 fixedly connected to the one side of the lower end face of the bearing plate 40; a toggle rotating shaft 74 rotationally connected to one end wall of the dosing space 32, wherein a toggle gear 49 is fixedly connected to the upper end of the shaft body of the toggle rotating shaft 74, and the one side of the rack 48 is in meshed engagement with the one end of the toggle gear 49; a toggle rod 51 fixedly connected to one end of the toggle rotating shaft 74, wherein the upper end of the toggle rod 51 penetrates through the one end of the drainage switch 54 and is in sliding connection with it; a capacity bucket 36 rotationally connected to the upper end wall of the bearing plate 40, wherein a return spring 53 is fixedly connected to the lower end face of the capacity bucket 36, wherein the lower end of the return spring 53 is fixedly connected with the upper end face of the bearing plate 40; a supporting block 39 fixedly connected to the one side of the upper end face of the bearing plate 40; a rotating block 38 fixedly connected to the one side of the lower end face of the capacity bucket 36, wherein the supporting block 39 is in rotational engagement with the rotating block 38; a guide rail 58 which is fixedly connected with the one end wall of the dosing space 32 arranged on the one side of the bearing plate 40, wherein a discharge pipeline 55 communicated with the outside space is arranged on one end wall of the dosing space 32, and a fourth electromagnetic switch 56 is arranged in the discharge pipeline 55; a warning mechanism 37 arranged on the upper end face of the work box 1.

Beneficially, the crushing mechanism 20 comprises a driving motor 24, wherein the driving motor 24 is fixedly connected with one end wall of the crushing driving space 71; wherein a driving shaft 17 is in power connection with one end face of the driving motor 24, and one end of the driving shaft 17 penetrates through the other end wall of the crushing driving space 71 and is rotationally connected with one end wall of the crushing space 14; a first driven shaft 16 arranged on the lower side of the driving motor 24, wherein one end of the first driven shaft 16 penetrates through the other end wall of the crushing driving space 71 and is rotationally connected with one end wall of the crushing space 14, and the other end of the first driven shaft 16 is rotationally connected with the one end wall of the crushing driving space 71; wherein the driving shaft 17 located in the crushing driving space 71 is fixedly connected with a transmission gear 23, and the lower side of the transmission gear 23 engages with a first driven gear 25 fixedly connected with the first driven shaft 16; wherein a second driven gear 26 fixedly connected with the first driven shaft 16 is arranged on one side of the first driven gear 25, and a fine crushing shaft 13 below the first driven shaft 16 is located in the crushing driving space 71, wherein one end of the fine crushing shaft 13 penetrates through the other end wall of the crushing driving space 71 and is rotationally connected with one end wall of the crushing space 14, and the other end of the fine crushing shaft 13 is rotationally connected with one end wall of the crushing driving space 71; wherein the fine crushing shaft 13 located in the crushing driving space 71 is fixedly connected with a belt gear 28 which is connected with the second driven gear 26 on the upper side through a belt 27, wherein a first fine crushing gear 29 fixedly connected with the fine crushing shaft 13 is arranged on the one side of the belt gear 28, wherein the lower side of the fine crushing shaft 13 is provided with a driven fine crushing shaft 12, wherein one end of the driven fine crushing shaft 12 penetrates through the other end wall of the crushing driving space 71 and is rotationally connected with one end wall of the crushing space 14, and the other end of the driven fine crushing shaft 12 is rotationally connected with one end wall of the crushing driving space 71; wherein the lower side of the first fine crushing gear 29 engages with a second fine crushing gear 30 fixedly connected with the driven fine crushing shaft 12; wherein a plurality of sets of rough cutting blades 15 are fixedly connected to the driving shaft 17 located in the crushing space 14 and the first driven shaft 16 located in the crushing space 14, and a plurality of sets of fine cutting blades 11 are fixedly connected to the fine crushing shaft 13 located in the crushing space 14 and the driven fine crushing shaft 12 located in the crushing space 14, which makes the kitchen garbage be crushed to be more rapidly and effectively fermented, Beneficially, the stirring mechanism 50 comprises a stirring motor 31, wherein the stirring motor 31 is fixedly connected with one end wall of the driving space 72, wherein one end surface of the stirring motor 31 is in power connection with a stirring driving shaft 22, one end of which penetrates through one end wall of the driving space 72 and is located in the transmission space 73, and is fixedly connected with a vertical bevel gear 21, wherein the lower side of the vertical bevel gear 21 engages with a horizontal bevel gear 19; a stirring shaft 6 fixedly connected with the center of the horizontal bevel gear, wherein the lower end of the stirring shaft 6 penetrates through the lower end wall of the transmission space 73 and is located in the stirring space 4, and the upper end of the stirring shaft 6 is rotationally connected with the upper end wall of the transmission space 73, and a plurality of groups of stirring rods 5 are fixedly connected to the lower end of the stirring shaft 6; a liquid injection pipeline 8 arranged on one end wall of the stirring space 4, wherein one end wall of the liquid injection pipeline 8 is communicated with the outside space, and a second electromagnetic switch 7 is arranged in the liquid injection pipeline 8, wherein the lower end wall of the stirring space 4 is provided with a garbage discharge pipeline 2 which slants down to the left and is communicated with the outside space, and a third electromagnetic switch 3 is arranged in the garbage discharge pipeline 2, and the fermentation broth output pipeline 33 communicated with the dosing space 32 is arranged on one end wall of the stirring space 4.

Beneficially, the length of the upper end of the one side of the C-shaped block 59 is far larger than the length of the lower end of the one side of the C-shaped block 59, and the height of the C-shaped block 59 is slightly larger than that of the capacity bucket 36, so that when the C-shaped block 59 moves towards one side, the upper end of the one side of it pushes the upper end of the capacity bucket 36, and the lower end of the one side of the C-shaped block 59 limits upward movement of the bearing plate 40.

Beneficially, the elasticity of the telescopic spring 47 is far larger than the sum of the gravity of the bearing plate 40 and the capacity bucket 36 on the upper end, so that the spring can easily rise the bearing plate to the original position after the bearing plate 40 is separated from the C-shaped block 59.

Beneficially, the warning mechanism 37 comprises a warning lamp 77; a power box 76 arranged in one end face of the work box 1, wherein the power box 76 is connected with the warning lamp 77 through an electric wire 75, which reminds people that the device is running.

The specific use mode of the invention is: when the invention is in the working process, the driving motor 24 works to drive the driving shaft 17 to rotate, and the first driven shaft 16 is driven to rotate under the transmission of the gear train; and then the first driven shaft 16 drives the fine crushing shaft 13 to rotate under the transmission of the belt 27, and the fine crushing shaft 13 drives the driven fine crushing shaft 12 to rotate under the transmission of the gear train; at this moment, the first electromagnetic switch 9 is turned on, and the kitchen garbage enters the crushing space 14 from the feed inlet 18, and the driving shaft 17 and the first transmission shaft 16 rotate to drive the rough cutting blade 15 to rotate, so that the kitchen garbage is preliminarily crushed; and then the fine crushing shaft 13 and the driven fine crushing shaft 12 rotate to drive the fine cutting blade to rotate, so that the kitchen garbage is further crushed, and the crushed kitchen garbage enters the stirring space 4 through the circulation pipeline 10; and then the driving motor 24 is turned off, and the stirring motor 31 is driven to work, which drives the stirring driving shaft 22 to rotate, and the stirring shaft 6 is driven to rotate under the transmission of the bevel gear train; at this moment, the first electromagnetic switch 9 is turned off, and the second electromagnetic switch 7 is turned on, and the fermentation broth is injected through the liquid injection pipeline 8; after the fermentation broth is injected, the second electromagnetic switch 7 is turned off for fermentation, and when fermentation is completed, an electromagnetic switch 101 in the fermentation broth output pipeline 33 is turned on, and the fermentation broth enters the capacity bucket 36 through the drainage pipeline 34 and the drainage hole 66. As the fermentation broth in the capacity bucket 36 is increasing, the bearing plate 40 is pressed downwards, and the rack 48 fixed on the bearing plate 40 drives the toggle gear 49 to rotate, so that the drainage switch 54 is driven to move forward, so that the drainage hole 66 is slowly closed, and when the fermentation broth in the capacity bucket 36 reaches a certain amount, the drainage hole 66 is completely closed, and then the fourth electromagnetic switch 56 is turned on, and the hydraulic pump 67 works, and the piston rod 63 is firstly moved towards one side, which drives the C-shaped block 59 at the top end of the piston rod 63 to move towards one side; the upper end of the C-shaped block 59 pushes the capacity bucket 36, so that the fermentation broth in the capacity bucket 36 is poured out, and the lower end of the C-shaped block 59 limits the lifting of the bearing plate 40, and the fermentation broth in the capacity bucket 36 flows into the discharge pipeline 55 through the guide rail 58 and then is discharged to the outside and collected; after the liquid in the capacity bucket 36 is completely poured out, the hydraulic pump 67 works reversely to drive the piston rod 63 to move towards one side, so that the C-shaped block 59 at the top end of the piston rod 63 returns to the original position; and then the capacity bucket 36 is separated from the upper end of the C-shaped block, and the capacity bucket 36 is returned to the original position through recovery of the return spring 53, and the bearing plate 40 is separated from the lower end of the C-shaped block 59 and is risen to the original position through the recovery of the telescopic spring 47, and then the toggle gear 49 and the rack 48 are driven to rotate so as to drive the drainage switch 54 to move to one side, so that the drainage hole 66 is completely opened; the fermentation liquid is poured into the capacity bucket 36 again, and after the fermentation broth in the stirring space 4 is exhausted, the electromagnetic switch in the fermentation broth output pipeline 33 is turned off, and the second electromagnetic switch 7 is turned on, and the stirring motor 31 is activated, and water is injected from the liquid injection pipeline 8 into the stirring space 4; when the water is injected to a certain amount, the second electromagnetic switch 7 is turned off, and the third electromagnetic switch 3 is turned on, so that the fermentation residues are discharged from the garbage discharge pipeline 2; the third electromagnetic switch 3 is turned off and the stirring motor 31 is turned off after the fermentation residues are discharged and the above steps are repeated. The device is simple in structure and convenient to operate, it enjoys the advantages that the energy-saving transmission of the device may be realized under mechanical transmission, and operation of the device may be realized under the condition of less power source, and the kitchen garbage may be fully fermented, so that the subsequent retreatment processes can be reduced.

It is obvious to those skilled in the art that the present invention is not limited to the details of the exemplary embodiments described above, and the present invention can be realized in other specific forms without departing from the spirit or essential characteristics of the invention. Therefore, the present embodiments are to be considered as exemplary and not restrictive, and the scope of the invention is defined by the appended claims rather than the description above, therefore all changes which come within the meaning and scope of equivalent elements in claims are included in the present invention.

The invention claimed is:

1. An environmentally friendly fertilizer device based on big data comprises a work box,
   wherein a crushing space is set in the work box;
   a feed inlet set in an upper end wall of the crushing space,
      wherein an upper end wall of the feed inlet is communicated with the outside;
   wherein a crushing driving space is set in one end wall of the crushing space,
      wherein a crushing mechanism is set in the crushing driving space;
   a transmission space arranged in a lower end wall of the crushing space;
   a driving space set in a lower end wall of the crushing driving space;
   a stirring space set in a lower end wall of the transmission space;
   a dosing space set in a lower end wall of the driving space;
   a hydraulic space mounted in a lower end wall of the stirring space;
   a circulation pipeline communicated with the stirring space set in the lower end wall of the crushing space,
      wherein a first electromagnetic switch is set in the circulation pipeline;
   a stirring mechanism arranged in the driving space;
   a hydraulic cavity set in one end wall of the hydraulic space,
      wherein a piston is slidably connected in the hydraulic cavity, and a piston rod is fixedly connected to one end face of the piston,
      wherein one end of the piston rod penetrates through one end wall of the hydraulic cavity and one end wall of the hydraulic space and is located in the dosing space,
      wherein a hydraulic pipeline communicated with the hydraulic cavity on the two sides of the piston is arranged in an upper end wall of the hydraulic cavity,
      wherein a hydraulic pump is arranged in the hydraulic pipeline;
   a C-shaped block fixedly connected to one end of the piston rod,
      wherein a sliding rod is fixedly connected to an upper end face of the piston rod located in the hydraulic space,
      wherein a sliding block groove is set in an upper end wall of the hydraulic space, and a lower end wall of the sliding block groove is communicated with the hydraulic space,
      wherein a sliding block is slidably connected in the sliding block groove,
      wherein an upper end of the sliding rod penetrates through the lower end wall of the sliding block groove and is fixedly connected with the sliding block;
   a drainage pipe fixedly connected to one end wall of the dosing space,
      wherein a drainage pipeline is arranged in the drainage pipe, and the drainage pipeline is communicated with a fermentation broth output pipeline,
      wherein a drainage switch is slidably connected in a lower end of the drainage pipeline, and the one end of the drainage switch penetrates through the one end wall of the drainage pipeline and is located in the dosing space;
      wherein the drainage switch is internally provided with a drainage hole, an upper end wall and a lower end wall of which penetrate through an upper end face and a lower end face of the drainage switch;

a spring block fixedly connected to a lower end wall of the dosing space, wherein a spring groove is set in an upper end face of the spring block, and a telescopic spring is fixedly connected to a lower end wall of the spring groove;

wherein an upper end of the telescopic spring penetrates through an upper end wall of the spring groove and is located in the dosing space, and a bearing plate is fixedly connected to the upper end of the telescopic spring, and the one side of the spring block is provided with a hydraulic cylinder fixedly connected with the lower end wall of the dosing space, wherein a pushing space is arranged in an interior of the hydraulic cylinder, and a hydraulic plate is slidably connected in the pushing space, wherein a pushing rod is fixedly connected to an upper end face of the hydraulic plate, and an upper end of the pushing rod penetrates through an upper end wall of the pushing space and is fixedly connected with a lower end face of the bearing plate;

a rack fixedly connected to the one side of the lower end face of the bearing plate;

a toggle rotating shaft rotationally connected to the one end wall of the dosing space, wherein a toggle gear is fixedly connected to an upper end of the shaft body of the toggle rotating shaft, and the one side of the rack is in meshed engagement with the one end of the toggle gear;

a toggle rod fixedly connected to one end of the toggle rotating shaft, wherein an upper end of the toggle rod penetrates through the one end of the drainage switch and is in sliding connection with it;

a capacity bucket rotationally connected to an upper end wall of the bearing plate, wherein a return spring is fixedly connected to a lower end face of the capacity bucket, wherein a lower end of the return spring is fixedly connected with an upper end face of the bearing plate;

a supporting block fixedly connected to the one side of the upper end face of the bearing plate;

a rotating block fixedly connected to one side of the lower end face of the capacity bucket, wherein the supporting block is in rotational engagement with the rotating block;

a guide rail fixedly connected with the one end wall of the dosing space arranged on the one side of the bearing plate, wherein a discharge pipeline communicated with the outside space is arranged on one end wall of the dosing space, and a fourth electromagnetic switch is arranged in the discharge pipeline;

a warning mechanism arranged on an upper end face of the work box.

2. The environmentally friendly fertilizer device based on big data of claim 1, wherein the crushing mechanism comprises a driving motor, wherein the driving motor is fixedly connected with one end wall of the crushing driving space;

wherein a driving shaft is in power connection with one end face of the driving motor, and one end of the driving shaft penetrates through the other end wall of the crushing driving space and is rotationally connected with one end wall of the crushing space;

a first driven shaft arranged on a lower side of the driving motor, wherein one end of the first driven shaft penetrates through the other end wall of the crushing driving space and is rotationally connected with one end wall of the crushing space, and the other end of the first driven shaft is rotationally connected with the one end wall of the crushing driving space;

wherein the driving shaft located in the crushing driving space is fixedly connected with a transmission gear, and a lower side of the transmission gear engages with a first driven gear fixedly connected with the first driven shaft;

wherein a second driven gear fixedly connected with the first driven shaft is arranged on one side of the first driven gear, and a fine crushing shaft below the first driven shaft is located in the crushing driving space, wherein one end of the fine crushing shaft penetrates through the other end wall of the crushing driving space and is rotationally connected with one end wall of the crushing space, and the other end of the fine crushing shaft is rotationally connected with one end wall of the crushing driving space;

wherein the fine crushing shaft located in the crushing driving space is fixedly connected with a belt gear which is connected with the second driven gear on an upper side through a belt, wherein a first fine crushing gear fixedly connected with the fine crushing shaft is arranged on the one side of the belt gear, wherein a lower side of the fine crushing shaft is provided with a driven fine crushing shaft, wherein one end of the driven fine crushing shaft penetrates through the other end wall of the crushing driving space and is rotationally connected with one end wall of the crushing space, and the other end of the driven fine crushing shaft is rotationally connected with one end wall of the crushing driving space;

wherein a lower side of the first fine crushing gear engages with a second fine crushing gear fixedly connected with the driven fine crushing shaft;

wherein a plurality of sets of rough cutting blades are fixedly connected to the driving shaft located in the crushing space and the first driven shaft located in the crushing space, and a plurality of sets of fine cutting blades are fixedly connected to the fine crushing shaft located in the crushing space and the driven fine crushing shaft located in the crushing space;

the driving motor works to drive the driving shaft to rotate, and the first driven shaft is driven to rotate under the transmission of the gear train; the first driven shaft drives the fine crushing shaft to rotate under the transmission of the belt, and the fine crushing shaft drives the driven fine crushing shaft to rotate under the transmission of the gear train; at this moment, the first electromagnetic switch is turned on, and the kitchen garbage enters the crushing space from the feed inlet, and the driving shaft and the first transmission shaft rotate to drive the rough cutting blade to rotate, so that the kitchen garbage is preliminarily crushed; and then the fine crushing shaft and the driven fine crushing shaft rotate to drive the fine cutting blade to rotate, so that the kitchen garbage is further crushed, and the crushed kitchen garbage enters the stirring space through the circulation pipeline.

3. The environmentally friendly fertilizer device based on big data of claim 1, wherein the stirring mechanism comprises a stirring motor, wherein the stirring motor is fixedly connected with one end wall of the driving space, wherein one end face of the stirring motor is in power connection with a stirring driving shaft, one end of which penetrates through the other end wall of the driving space and is located in the transmission space, and is fixedly connected with a vertical bevel gear;

wherein a lower side of the vertical bevel gear engages with a horizontal bevel gear;

a stirring shaft fixedly connected with a center of the horizontal bevel gear, wherein a lower end of the stirring shaft penetrates through the lower end wall of the transmission space and is located in the stirring space, and an upper end of the stirring shaft is rotationally connected with an upper end wall of the transmission space, and a plurality of groups of stirring rods are fixedly connected to the lower end of the stirring shaft;

a liquid injection pipeline arranged on one end wall of the stirring space, wherein one end wall of the liquid injection pipeline is communicated with the outside space, and a second electromagnetic switch is arranged in the liquid injection pipeline;

wherein a lower end wall of the stirring space is provided with a garbage discharge pipeline which slants down to the left and is communicated with the outside space, and a third electromagnetic switch is arranged in the garbage discharge pipeline, and the fermentation broth output pipeline communicated with the dosing space is arranged on the other end wall of the stirring space;

and then the stirring motor is driven to work, which drives the stirring driving shaft to rotate, and the stirring shaft is driven to rotate under the transmission of the bevel gear train; at this moment, the first electromagnetic switch is turned off, and the second electromagnetic switch is turned on, and the fermentation broth is injected through the liquid injection pipeline; after the fermentation broth is injected, the second electromagnetic switch is turned off for fermentation, and when fermentation is completed, an electromagnetic switch in the fermentation broth output pipeline is turned on, and the fermentation broth enters the capacity bucket through the drainage pipeline and the drainage hole; as the fermentation broth in the capacity bucket is increasing, the bearing plate is pressed downwards, and the rack fixed on the bearing plate drives the toggle gear to rotate, so that the drainage switch is driven to move forward, so that the drainage hole is slowly closed, and when the fermentation broth in the capacity bucket reaches a certain amount, the drainage hole is completely closed.

4. The environmentally friendly fertilizer device based on big data of claim 1, wherein the length of an upper end of one side of the C-shaped block is far larger than the length of a lower end of the one side of the C-shaped block, and the height of the C-shaped block is slightly larger than that of the capacity bucket.

5. The environmentally friendly fertilizer device based on big data of claim 1, wherein the elasticity of the telescopic spring is larger than the sum of the gravity of the bearing plate and the capacity bucket on an upper end.

6. The environmentally friendly fertilizer device based on big data of claim 1, wherein the warning mechanism comprises a warning lamp;

a power box arranged in one end face of the work box, wherein the power box is connected with the warning lamp through an electric wire, and the warning lamp reminds people that the device is running.

* * * * *